United States Patent
Kang et al.

(10) Patent No.: US 10,394,425 B2
(45) Date of Patent: Aug. 27, 2019

(54) SYSTEM FOR PROVIDING MOTION AND VOICE BASED BOOKMARK AND METHOD THEREFOR

(71) Applicant: SK PLANET CO., LTD., Seongnam-si, Gyeonggi-do (KR)

(72) Inventors: Seong Wook Kang, Seongnam-si (KR); Eun Bok Lee, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 363 days.

(21) Appl. No.: 14/406,336

(22) PCT Filed: Jul. 31, 2013

(86) PCT No.: PCT/KR2013/006913
§ 371 (c)(1),
(2) Date: Dec. 8, 2014

(87) PCT Pub. No.: WO2014/061905
PCT Pub. Date: Apr. 24, 2014

(65) Prior Publication Data
US 2015/0185985 A1 Jul. 2, 2015

(30) Foreign Application Priority Data

Oct. 16, 2012 (KR) .................. 10-2012-0114844
Oct. 25, 2012 (KR) .................. 10-2012-0119037

(51) Int. Cl.
*G06F 3/048* (2013.01)
*G06F 3/0483* (2013.01)
(Continued)

(52) U.S. Cl.
CPC ............ *G06F 3/0483* (2013.01); *G06F 3/017* (2013.01); *G06F 3/0304* (2013.01); *G06F 3/167* (2013.01);
(Continued)

(58) Field of Classification Search
CPC .......... G06F 3/048; G06F 3/167; G06F 3/017
See application file for complete search history.

(56) References Cited

U.S. PATENT DOCUMENTS 7,313,525 B1 12/2007 Packingham et al.
10,073,595 B2 9/2018 Lee et al.
(Continued)

FOREIGN PATENT DOCUMENTS

JP 2008-140309 A 6/2008
KR 10-1999-0015328 A 3/1998
(Continued)

OTHER PUBLICATIONS

International Search Report for PCT/KR2013/006913 dated Nov. 26, 2013.

*Primary Examiner* — Xuyang Xia
(74) *Attorney, Agent, or Firm* — Brinks Gilson & Lione

(57) ABSTRACT

The present invention relates to a system and a method for providing a motion or voice based bookmark on a mobile web page, wherein: a bookmark is set by mapping an inputted bookmarking motion or voice to address information of a corresponding mobile web page when the bookmarking motion or voice is inputted through a bookmark screen in a user terminal; the bookmark is stored in a bookmark database; and a page is converted into the mobile web page of the address information which is mapped and stored in advance with respect to an inputted motion or voice by referring to the bookmark database if the same motion or voice as the bookmarking motion or voice is inputted, thereby increasing convenience of access to the mobile web page.

5 Claims, 5 Drawing Sheets

(51) Int. Cl.

| | | |
|---|---|---|
| *G06F 16/683* | (2019.01) | |
| *H04M 1/725* | (2006.01) | |
| *G06F 3/01* | (2006.01) | |
| *G06F 3/16* | (2006.01) | |
| *G10L 15/22* | (2006.01) | |
| *G06F 3/03* | (2006.01) | |
| *G06F 16/955* | (2019.01) | |

(52) U.S. Cl.
CPC ........ *G06F 16/683* (2019.01); *G06F 16/9562* (2019.01); *G10L 15/22* (2013.01); *H04M 1/72561* (2013.01); *G10L 2015/223* (2013.01); *H04M 2250/12* (2013.01); *H04M 2250/74* (2013.01)

(56) References Cited

U.S. PATENT DOCUMENTS

| | | | |
|---|---|---|---|
| 2002/0184095 A1* | 12/2002 | Scullard | G06Q 30/02 705/14.21 |
| 2003/0032456 A1* | 2/2003 | Mumick | H04M 3/4938 455/566 |
| 2008/0133238 A1 | 6/2008 | Yamamoto et al. | |
| 2009/0253463 A1* | 10/2009 | Shin | H04M 1/72583 455/563 |
| 2010/0107046 A1* | 4/2010 | Kang | G06F 3/0482 715/207 |
| 2011/0041102 A1* | 2/2011 | Kim | G06F 3/04883 715/863 |
| 2012/0084705 A1* | 4/2012 | Lee | G06F 3/0483 715/776 |
| 2012/0157165 A1* | 6/2012 | Kim | G06F 21/6218 455/566 |
| 2012/0293528 A1* | 11/2012 | Larsen | G09G 3/20 345/589 |
| 2012/0317503 A1* | 12/2012 | Noh | G06F 3/04883 715/760 |
| 2013/0162518 A1* | 6/2013 | Athavale | G09G 5/00 345/156 |

FOREIGN PATENT DOCUMENTS

| | | |
|---|---|---|
| KR | 100799674 B1 | 1/2008 |
| KR | 1020080044605 A | 5/2008 |
| KR | 1020090020921 A | 2/2009 |
| KR | 1020100031276 A | 3/2010 |
| KR | 10-2010-0053093 A | 5/2010 |
| KR | 1020110012276 A | 2/2011 |
| KR | 10-2012-0034542 A | 4/2012 |
| KR | 10-2012-0091495 A | 8/2012 |

* cited by examiner

SYSTEM FOR PROVIDING MOTION AND VOICE BASED BOOKMARK AND METHOD THEREFOR

TECHNICAL FIELD

The present invention relates to a system for providing a bookmark based on a motion or a voice and a method thereof, which can set a bookmark based on an input motion or voice according to handling of a user so as to make it easy to access the bookmark later.

BACKGROUND ART

A mobile terminal providing a wireless Internet service, i.e., a user terminal, mounts a wireless web browser so that a user may view a web page. However, the user terminal has a screen of a relatively small size compared with a wired Internet connection device such as a computer or the like. Therefore, it is inconvenient to set or search for a bookmark for a specific mobile web page. For example, although a bookmark may be set by simply selecting a menu or a button, in order to access a specific page for which a bookmark is set, an inconvenient process of displaying a bookmark list on a screen and selecting a desired page from the list by a user himself or herself is required.

DISCLOSURE OF INVENTION

Technical Problem

Therefore, the present invention has been made in view of the above problem, and it is an object of the present invention to provide a system for providing a bookmark based on a motion or a voice and a method thereof, which improves convenience of accessing a mobile web page by inputting a motion or a voice which can be easily accessed by a user through intuition and setting a bookmark based on pattern matching of the motion or the voice.

Technical Solution

To accomplish the above object, according to one aspect of the present invention, there is provided a service providing server including: a bookmark screen providing unit allowing a user terminal to display a bookmark screen for inputting a motion or a voice for setting a bookmark in a predetermined area of a mobile web page; a bookmark setting unit for displaying, if a bookmark motion or voice is input through the bookmark screen, the input bookmark motion or voice on the bookmark screen, and setting a bookmark by mapping the input bookmark motion or voice to address information of a corresponding mobile web page; a bookmark database for storing the address information of a corresponding mobile web page mapped to the input bookmark motion or voice; and a bookmark moving unit for switching, when a motion or a voice the same as the bookmark motion or voice is input through the user terminal, to a mobile web page of address information previously mapped to the input motion or voice and stored, with reference to the bookmark database.

According to another aspect of the present invention, there is provided a user terminal including: a display unit for displaying a bookmark screen for inputting a motion or a voice for setting a bookmark in a predetermined area of a mobile web page and, if a bookmark motion or voice is input through the bookmark screen, displaying the input bookmark motion or voice on the bookmark screen; a camera unit for photographing a motion according to handling of a user through the bookmark screen; a voice recognition unit for recognizing the voice input through the bookmark screen; a control unit for patterning and recognizing a motion according to handling of a user photographed by the camera unit, displaying the recognized bookmark motion on the bookmark screen, setting a bookmark by mapping the recognized bookmark motion to address information of a corresponding mobile web page in association with a service providing server, and, when a motion the same as the bookmark motion is input, switching to a mobile web page of address information previously mapped for the input motion; and a browser engine for outputting, when a voice input command is input through a web/wap page output on the display unit, a voice input screen in a predetermined area of the web/wap page and, at the same time, driving the voice recognition unit, and setting a bookmark by mapping the voice recognized by the voice recognition unit to an address of the web/wap page or switching to a web/wap page mapped to the recognized voice among previously stored bookmarks.

In addition, the browser engine may include: a bookmark screen output control unit for outputting, when a voice input command is input through the web/wap page output on the display unit, a bookmark screen in a predetermined area of the web/wap page; a voice recognition processing unit for driving the voice recognition unit when a voice input start command is input through the bookmark screen and receiving a voice recognized by the voice recognition unit when a voice input end command is input; a bookmark mapping unit for setting, when a bookmark command is input through the bookmark screen, a bookmark by mapping the voice recognized by the voice recognition unit to an address of a currently output web/wap page; and a bookmark switch unit for determining, when a move command is input through the bookmark screen, whether or not a web/wap page address mapped to the voice recognized by the voice recognition unit exists among previously stored bookmarks, switching to a corresponding web/wap page if a web/wap page address mapped to the recognized voice exists, and outputting a re-input message if a web/wap page address mapped to the recognized voice does not exist.

According to still another aspect of the present invention, there is provided a bookmark providing system based on a motion or a voice, the system including: a user terminal for displaying a bookmark screen for inputting a motion or a voice for setting a bookmark in a predetermined area of a mobile web page and, if a bookmark motion or voice is input through the bookmark screen, displaying the input bookmark motion or voice on the bookmark screen; and a service providing server for setting, when the bookmark motion or voice is input through the bookmark screen of the user terminal, a bookmark by mapping the input bookmark motion or voice to address information of a corresponding mobile web page, storing the bookmark in a bookmark database, and, when a motion or a voice the same as the bookmark motion or voice is input, switching to a mobile web page of address information previously mapped to the input motion or voice and stored, with reference to the bookmark database.

According to still another aspect of the present invention, there is provided a bookmark providing method based on a motion, the method including the steps of: displaying, by a user terminal, a bookmark screen for inputting a motion for setting a bookmark in a predetermined area of a mobile web page; receiving, by the user terminal, a bookmark motion through the bookmark screen and displaying the input bookmark motion on the bookmark screen; setting, by a web page providing server, a bookmark by mapping the bookmark motion input through the user terminal to address information of a corresponding mobile web page and storing the bookmark in a bookmark database; transmitting, by the user terminal, motion input information according to handling of a user to the web page providing server; and switching, by the service providing server, if the motion input information transmitted from the user terminal is the same as a previously stored bookmark motion, to a mobile web page of address information previously mapped to the corresponding bookmark motion and stored.

According to still another aspect of the present invention, there is provided a method of providing a bookmark based on a motion by a web page providing server in a mobile web page, the method including the steps of: displaying, by a user terminal, a bookmark screen for inputting a motion for setting a bookmark in a predetermined area of the mobile web page and, if a bookmark motion is input through the bookmark screen, displaying the input bookmark motion on the bookmark screen; setting a bookmark by mapping the input bookmark motion to address information of a corresponding mobile web page and storing the bookmark in the bookmark database; and switching, by the user terminal, when a motion the same as the bookmark motion is input, to a mobile web page of address information previously mapped to the input motion and stored, with reference to the bookmark database.

According to still another aspect of the present invention, there is provided a method of providing a bookmark service based on a voice by a user terminal, the method including the steps of: (a) outputting, if a voice input command is input while a specific web/wap page is output, a bookmark screen in a predetermined area of the specific web/wap page; (b) driving, if a voice input start command is input through the bookmark screen, a provided voice recognition unit and recognizing an input voice through the voice recognition unit; and (c) setting, if a bookmark command is input through the bookmark screen, a bookmark by mapping the recognized voice to an address of the specific web/wap page.

According to still another aspect of the present invention, there is provided a recording medium which can be read by an electronic device, in which a method of providing a bookmark service based on a motion by a web page providing server is recorded as a program, the method including the steps of: displaying, by a user terminal, a bookmark screen for inputting a motion for setting a bookmark in a predetermined area of a mobile web page and, if a bookmark motion is input through the bookmark screen, displaying the input bookmark motion on the bookmark screen; setting a bookmark by mapping the input bookmark motion to address information of a corresponding mobile web page and storing the bookmark in the bookmark database 210; and switching, by the user terminal, when a motion the same as the bookmark motion is input, to a mobile web page of address information previously mapped to the input motion and stored, with reference to the bookmark database.

According to still another aspect of the present invention, there is provided a recording medium which can be read by an electronic device, in which a bookmark service providing method based on a voice is recorded as a program, the method including the steps of: (a) outputting, if a voice input command is input while a specific web/wap page is output, a bookmark screen in a predetermined area of the specific web/wap page; (b) driving, if a voice input start command is input through the bookmark screen, a provided voice recognition unit and recognizing an input voice through the voice recognition unit; and (c) setting, if a bookmark command is input through the bookmark screen, a bookmark by mapping the recognized voice to an address of the specific web/wap page.

Advantageous Effects

The present invention as described above may provide a system for providing a bookmark based on a motion or a voice and a method thereof, which improves convenience of accessing a mobile web page by inputting a motion or a voice which can be easily accessed by a user through intuition and setting a bookmark based on pattern matching of the motion or the voice.

That is, since a user utilizes a simple motion or a voice to access a specific web site in a mobile environment in which input of a URL or the like is not easy, access to a web site and management of a bookmark can be easily accomplished.

Figure 1:
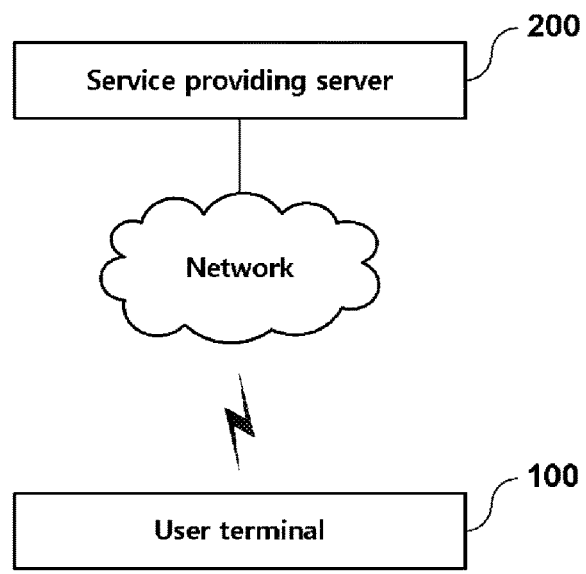
FIG. 1 is a view showing the configuration of a bookmark providing system based on a motion or a voice according to an embodiment of the present invention.

| DESCRIPTION OF SYMBOLS | |
|---|---|
| 100: user terminal | 200: Service providing server |
| 202: Bookmark screen providing unit | 204: Bookmark setting unit |
| 206: Bookmark moving unit | 210: Bookmark database |
| 300: Control unit | 302: Communication unit |
| 304: Camera unit | 306: Handling unit |
| 308: Display unit | 310: Sound output unit |
| 312: Storage unit | 320: Voice recognition unit |
| 330: Browser engine | 332: Bookmark screen output control unit |
| 334: Voice recognition processing unit | 336: Bookmark mapping unit |
| 338: Bookmark switch unit | |

MODE FOR INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

FIG. 1 is a view showing the configuration of a bookmark providing system based on a motion or a voice according to an embodiment of the present invention.

Referring to FIG. 1, a bookmark providing system based on a motion or a voice according to an embodiment of the present invention includes a user terminal 100 and a service providing server 200.

The user terminal 100 displays a bookmark screen for inputting a motion or a voice for setting a bookmark in a predetermined area of a mobile web/wap page and, if a motion or a voice is input through the bookmark screen, displays the input bookmark motion or voice on the bookmark screen.

A user device having a communication function and a near field communication function mounted thereon can be applied as such a user terminal 100. For example, the user terminal may be a variety of devices such as a notebook computer, a wireless communication terminal, a smart phone, a portable media player (PMP), a personal digital assistant (PDA), a tablet PC, a set-top box, a smart TV and the like.

When a bookmark motion or voice is input through the bookmark screen of the user terminal 100, the service providing server sets a bookmark by mapping the input bookmark motion or voice to address information of a corresponding mobile web/wap page, stores the bookmark in a bookmark database 210, and, when a motion or a voice the same as the bookmark motion or voice is input, switches to a mobile web/wap page of address information previously mapped to the input motion or voice and stored, with reference to the bookmark database 210.

At this point, the service providing server 200 may provide a menu for setting a bookmark for a mobile web/wap page or moving to a mobile web/wap page for which a bookmark is previously set on the mobile web/wap page. Here, the menu can be provided in the form of a menu bar or a pop-up window.

In addition, the service providing server 200 may set a bookmark by mapping an input bookmark motion to a uniform resource locator (URL) of a corresponding mobile web/wap page.

Figure 2:
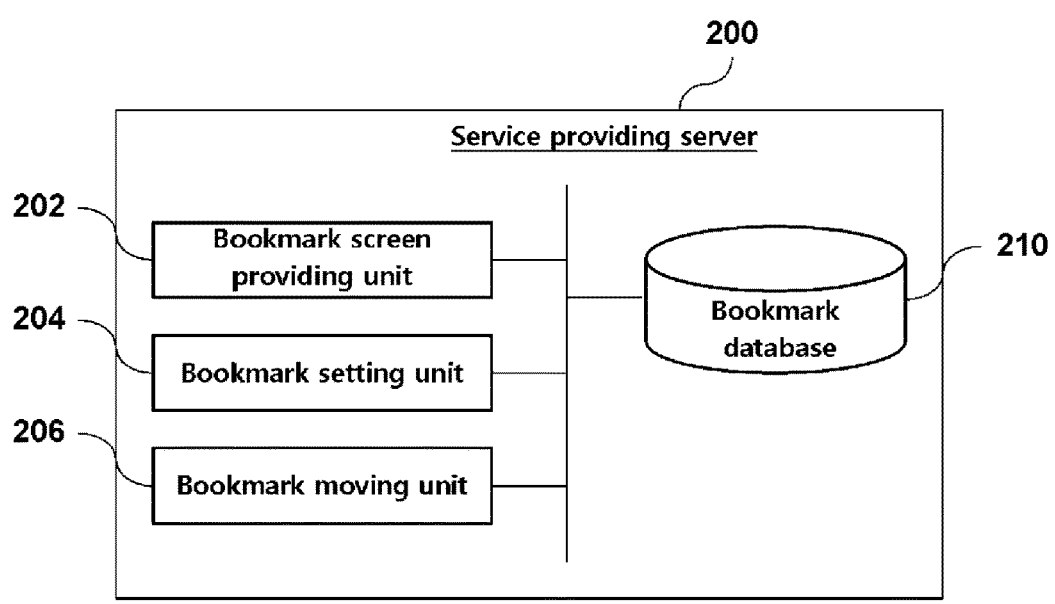
FIG. 2 is a view showing the internal configuration of a web page providing server according to an embodiment of the present invention.

FIG. 2 is a view showing the internal configuration of a service providing server 200 according to an embodiment of the present invention.

Referring to FIG. 2, a service providing server 200 according to an embodiment of the present invention may include a bookmark screen providing unit 202, a bookmark setting unit 204, a bookmark moving unit 206 and a bookmark database 210.

The bookmark screen providing unit 202 allows the user terminal to display a bookmark screen for inputting a motion or a voice for setting a bookmark in a predetermined area of a mobile web/wap page.

At this point, the bookmark screen providing unit 202 may provide a menu for setting a bookmark for a mobile web/wap page or moving to a mobile web/wap page for which a bookmark is previously set on the mobile web/wap page. In addition, the bookmark screen providing unit 202 may include a button or a tab menu for setting a start of inputting a motion or a voice and an end of inputting the motion or the voice in the bookmark screen.

If a bookmark motion or voice is input through the bookmark screen, the bookmark setting unit 204 displays the input bookmark motion or voice on the bookmark screen and sets a bookmark by mapping the input bookmark motion or voice to address information of a corresponding mobile web/wap page.

When a motion or a voice the same as the bookmark motion or voice is input through the user terminal, the bookmark moving unit 206 switches to a mobile web/wap page of address information previously mapped to the input motion or voice and stored, with reference to the bookmark database 210.

The bookmark database 210 stores address information of a corresponding mobile web page mapped to the input bookmark motion or voice.

Figure 3:
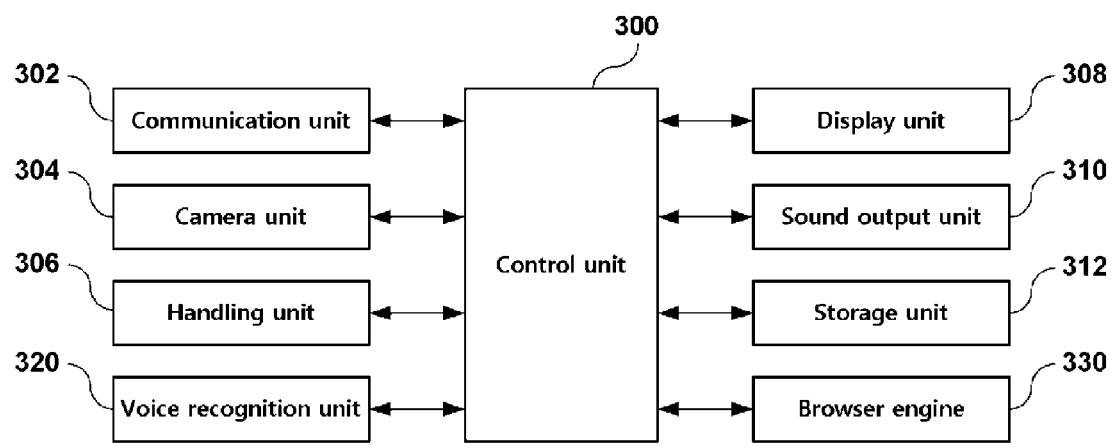
FIG. 3 is a view showing the internal configuration of a user terminal according to an embodiment of the present invention.
Figure 5:
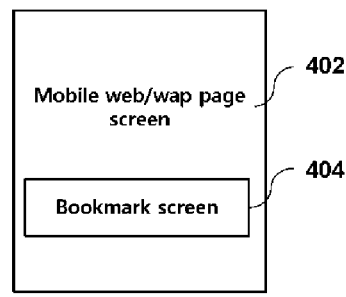
FIG. 5 is a view showing a mobile web page screen according to an embodiment of the present invention.

FIG. 3 is a view showing the internal configuration of a user terminal 100 according to an embodiment of the present invention, and FIG. 5 is a view showing a mobile web/wap page screen 402 according to an embodiment of the present invention.

Referring to FIG. 3, a user terminal according to an embodiment of the present invention may include a communication unit 302, a camera unit 304, a voice recognition unit 320, a handling unit 306, a display unit 308, a sound output unit 310, a storage unit 312, a browser engine 330 and a control unit 300.

The communication unit 302 may include a mobile communication module, a wireless Internet module, a near field communication module and the like, and the mobile communication module transmits and receives wireless signals of a base station on a mobile communication network, the wireless Internet module is a module for wireless Internet connection, and the near field communication module a module for near field communication. At this point, the communication unit 302 may be associated with a web/wap page providing server through the wireless Internet module.

The camera unit 304 processes image frames such as still images or moving images obtained by an image sensor in a video communication mode or a photographing mode. In addition, a processed image frame may be displayed on the display unit 308. In addition, the image frame processed by the camera unit 304 may be stored in the storage unit 312 or transmitted outside through the communication unit 302. In addition, the camera unit 304 may photograph a motion according to handling of a user through the bookmark screen.

The voice recognition unit 320 receives a voice or audio signal of a user through a microphone or the like. At this point, the voice recognition unit 320 may be driven under the control of the browser engine 320 and recognize a voice input through the bookmark screen.

The voice recognition unit 320 extracts an object voice section, which is a section of a voice signal desired to be input by a user or the like, from a voice signal input through a voice input device such as a microphone or the like, performs a process of eliminating noises existing in the detected object voice section, and finally recognizes a word or a language corresponding to the voice signal.

Since a method of the voice recognition unit 320 for recognizing a voice is already well-known, detailed descriptions thereof will be omitted. One of various well-known methods may be used as a method of recognizing a voice in this embodiment.

The handling unit 306 generates a key input data input by a user to control operation of the terminal and may be configured of a key pad, a dome switch, a touch pad or the like. Particularly, the touch pad may be implemented in a touch screen which forms a layer structure together with the display unit 308.

The display unit 308 displays information processed by the user terminal on the screen and further includes a touch sensing module to receive a handling signal according to handling of a user. That is, the display unit 308 may display a bookmark screen for inputting a motion or a voice for setting a bookmark in a predetermined area of a mobile web/wap page and, if a bookmark motion or voice is input through the bookmark screen, display the input bookmark motion or voice on the bookmark screen.

At this point, the display unit 308 may display the bookmark screen 404 as an additional screen on a mobile web/wap page screen as shown in FIG. 5, for example, display the bookmark screen 404 at a lower portion of the mobile web page in the case of a landscape mode or display the bookmark screen 404 on the right side of the mobile web page in the case of a portrait mode.

In addition, the display unit 308 is a display means for displaying screen information according to driving of an application, and although the display unit 308 is preferably implemented in a small flat panel display device such as a liquid crystal display (LCD), an organic light emitting diode (OLED), a touch screen or the like, it is not limited thereto.

The sound output unit 310 may output a voice signal received through the communication unit 302 in a communication mode or audio data stored in the storage unit 312.

The storage unit 312 may store a program for performing a process and control of the control unit 300 and temporarily store input or output data. In addition, the storage unit 312 may store an app for performing a bookmark providing method based on a motion or a voice in a mobile web/wap page according to an embodiment of the present invention.

The control unit 300 generally controls overall operation of the user terminal by controlling each part of the terminal. In addition, the control unit 300 may patternize and recognize a motion according to handling of a user photographed by the camera unit 304, display the recognized bookmark motion on the bookmark screen, set a bookmark by mapping the recognized bookmark motion to address information of a corresponding mobile web/wap page in association with the service providing server, and, when a motion the same as the bookmark motion is input, switch to a mobile web/wap page of the address information previously mapped for the input motion.

When a voice input command is input through a web/wap page output on the display unit 308, the browser engine 330 outputs a voice input screen in a predetermined area of the web/wap page and, at the same time, drives the voice recognition unit 320, and sets a bookmark by mapping the voice recognized by the voice recognition unit 320 to the address of the web/wap page or switches to a web/wap page mapped to the recognized voice among previously stored bookmarks.

The browser engine 330 analyzes and executes logic implemented in a web code. For example, the browser engine 330 analyzes and executes web-based logic such as a markup language, i.e., HyperText Markup Language (HTML), a script, CSS or the like.

Figure 4:
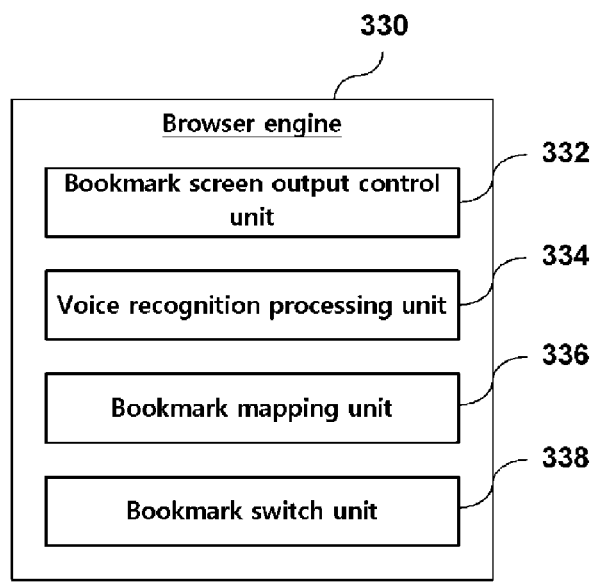
FIG. 4 is a view showing the internal configuration of a browser engine according to an embodiment of the present invention.

Referring to FIG. 4 for the browser engine 330, the browser engine 330 includes a bookmark screen output control unit 332, a voice recognition processing unit 334, a bookmark mapping unit 336 and a bookmark switch unit 338.

When a voice input command is input through the web/wap page output on the display unit 308, the bookmark screen output control unit 332 outputs a bookmark screen in a predetermined area of the web/wap page. At this point, the voice input command may be displayed in the form of a menu bar in a predetermined area of the web/wap page or may be displayed in the form of a pop-up window.

In addition, the bookmark screen output control unit 332 may output a voice input screen as an additional screen on a web/wap page, for example, output the voice input screen at a lower portion of the web/wap page in the case of a landscape mode or output the voice input screen on the left or right side of the web/wap page in the case of a portrait mode. Here, a voice input start command, a voice input end command, a bookmark command, a move command and the like may be displayed on the bookmark screen, and each of the commands may be displayed in the form of a button, a menu or the like. The voice input start command may be a command for setting a start of voice input, and the voice input end command may be a command for setting an end of the voice input. The bookmark command may be a command for setting a currently output web/wap page as a bookmark, and the move command may be a command for moving to a web/wap page for which a bookmark is previously set.

The voice recognition processing unit 334 drives the voice recognition unit 320 when the voice input start command is input through the bookmark screen and receives a voice recognized by the voice recognition unit 320 when the voice input end command is input.

When the bookmark command is input through the bookmark screen, the bookmark mapping unit 336 sets a bookmark by mapping the voice recognized by the voice recognition unit 334 to the address of the currently output web/wap page. At this point, the address of the web/wap page may include a URL or the like of the web/wap page.

When the move command is input through the bookmark screen, the bookmark switch unit 338 determines whether or not a web/wap page address mapped to the voice recognized by the voice recognition unit 334 exists among previously stored bookmarks. If a web/wap page address mapped to the recognized voice exists, the bookmark switch unit 338 transmits a web/wap page request signal including the web/wap page address to the web page providing server, receives a corresponding web/wap page from the web page providing server and outputs the web/wap page. In addition, if a web/wap page address mapped to the recognized voice does not exist, the bookmark switch unit 338 outputs a re-input message. The re-input message may be output in the form of a pop-up window.

Figure 6:
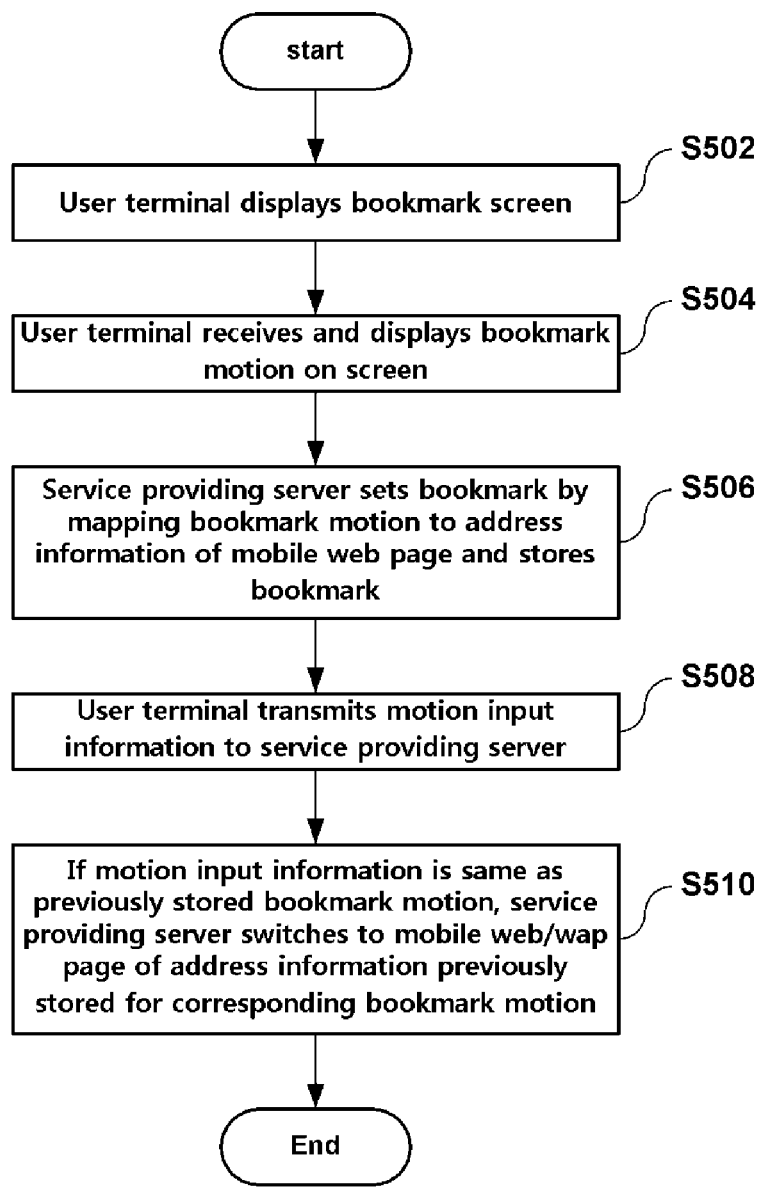
FIG. 6 is a flowchart illustrating a bookmark providing method based on a motion in a mobile web page according to an embodiment of the present invention.

FIG. 6 is a flowchart illustrating a bookmark providing method based on a motion according to an embodiment of the present invention.

Referring to FIG. 6, the user terminal according to the present invention displays a bookmark screen for inputting a motion for setting a bookmark in a predetermined area of a mobile web/wap page S502.

In addition, the user terminal receives a bookmark motion through the bookmark screen and displays the input bookmark motion on the bookmark screen S504.

Accordingly, the service providing server 200 sets a bookmark by mapping the bookmark motion input through the user terminal to address information of a corresponding mobile web/wap page and stores the bookmark in the bookmark database 210 S506.

Meanwhile, the user terminal transmits motion input information according to handling of the user to the service providing server 200 S508.

At this point, if the motion input information transmitted from the user terminal is the same as a previously stored bookmark motion, the service providing server 200 switches to a mobile web/wap page of address information previously mapped to the corresponding bookmark motion and stored S510. Here, if a bookmark motion corresponding to the transmitted motion input information does not exist, the service providing server 200 may display a re-input request message on the user terminal.

For example, in the case where a bookmark is desired to be set for a specific mobile web/wap page, if a motion input menu is selected by a user and a motion input start menu is selected from a motion input window, a photographing or moving image mode of the camera unit 304 is activated, and then if input of a user's motion (e.g., any motion can be accepted) to be used in association with a corresponding mobile web/wap page is started, recording of the camera starts to progress, and the motion of the user is displayed in a two-dimensional form on the motion input window. If input of the motion is completed, i.e., if a motion input end menu is selected and a bookmark button is selected on the motion input window, the browser records the URL of a corresponding mobile web/wap page in the bookmark, maps a corresponding input motion to the URL and stores the URL.

In addition, in the case where a mobile web/wap page of a previously set motion-based bookmark is accessed, if the motion input menu is selected by the user, a photographing or moving image mode of the camera unit 304 is activated, and the motion input start menu is selected from an input window to input a previously stored motion. If the user completes input of a motion and the motion input end menu is selected, pattern recognition is started for the corresponding input after recording of the camera is finished, and if a move button is selected, existence of a mobile web/wap page associated with the corresponding motion is confirmed. If an associated mobile web/wap page exists, the screen moves to the corresponding mobile web page, and if an associated mobile web/wap page does not exist, a re-input request message is displayed in the form of a pop-up window.

On the other hand, according to another aspect of the present invention, a method of providing a bookmark based on a motion by the service providing server 200 may include the steps of: displaying, by a user terminal, a bookmark screen for inputting a motion for setting a bookmark in a predetermined area of a mobile web/wap page and, if a bookmark motion is input through the bookmark screen, displaying the input bookmark motion on the bookmark screen; setting a bookmark by mapping the input bookmark motion to address information of a corresponding mobile web/wap page and storing the bookmark in the bookmark database 210; and switching, when a motion the same as the bookmark motion is input through the user terminal, to a mobile web/wap page of address information previously mapped to the input motion and stored, with reference to the bookmark database 210.

Figure 7:
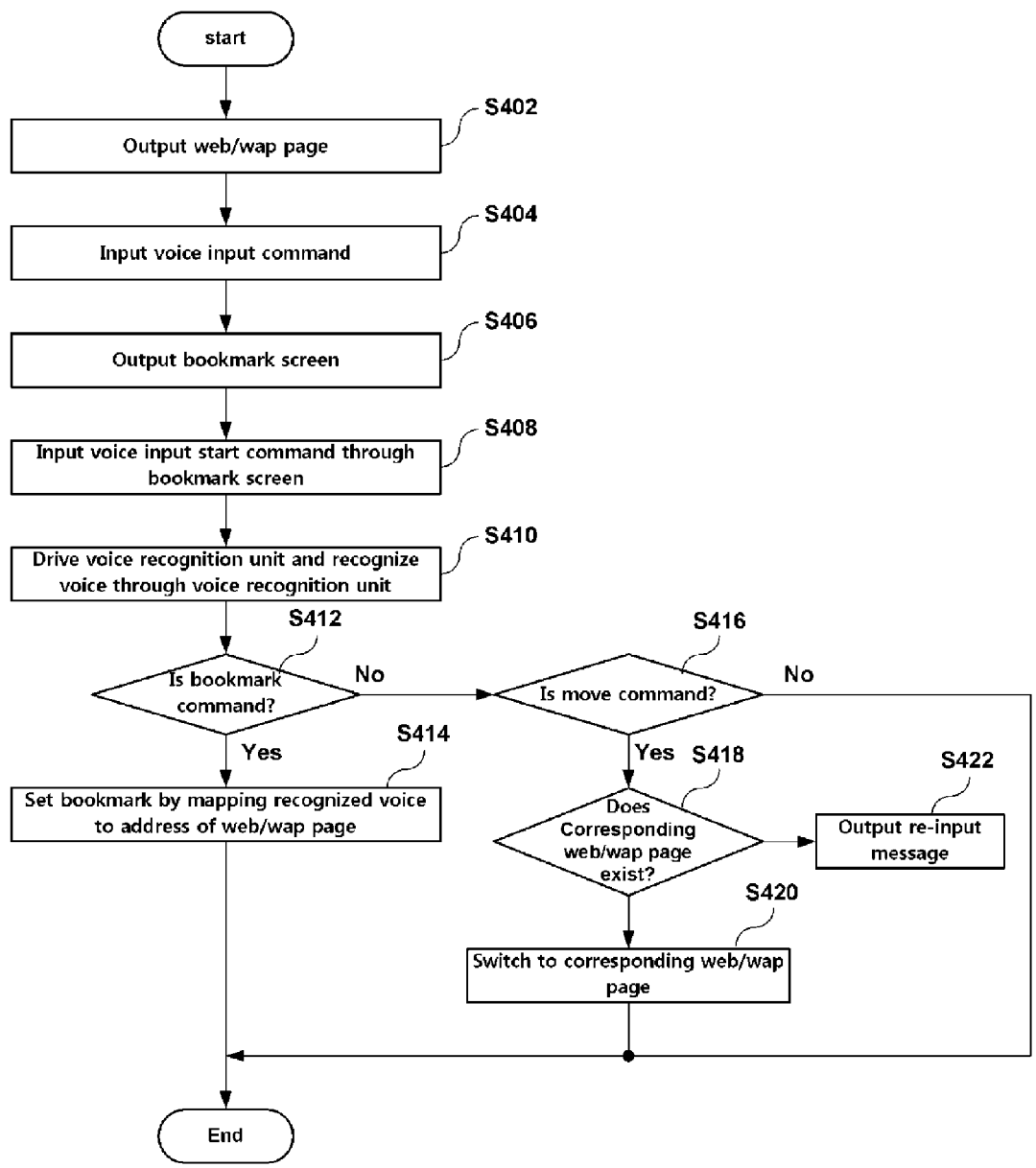
FIG. 7 is a flowchart illustrating a bookmark providing method based on a voice in a mobile web page according to an embodiment of the present invention.

FIG. 7 is a flowchart illustrating a bookmark providing method based on a voice according to an embodiment of the present invention.

Referring to FIG. 7, if a voice input command is input S404 while a web/wap page is output (S402), the user terminal outputs a bookmark screen in a predetermined area of the web/wap page (S406). Since a menu bar or a pop-up window displaying the voice input command is displayed in the predetermined area of the web/wap page, a user may input a voice input command through the web/wap page. Then, the user terminal outputs a bookmark screen including a voice input start command, a voice input end command, a bookmark command, a move command and the like in the predetermined area of the web/wap page.

After performing step S406, if the user inputs the voice input start command through the bookmark screen (S408), the user terminal drives the voice recognition unit 320 and recognizes an input voice through the voice recognition unit 320 (S410).

That is, if the user inputs the voice input start command through the bookmark screen, the user terminal drives the voice recognition unit 320. Then, the user inputs a voice through a microphone or the like, and the voice recognition unit 320 recognizes the voice input through the microphone. At this point, the user does not need to input a language (e.g., a word) that can be recognized by a human being or a terminal as a voice. For example, if a currently output web/wap page is 'Facebook', although the user may input a voice that can be recognized as a word such as 'Facebook', a voice that cannot be recognized as a word such as 'Fpa' or the like may be input.

If the user inputs a voice, the user terminal recognizes the input voice. At this point, since the user terminal may recognize the voice using one of various well-known methods, detailed descriptions thereof will be omitted.

The user terminal recognizes the voice input by the user until the voice input end command is input through the bookmark screen.

After performing step S410, the user terminal determines whether or not the bookmark command is input (S412). That is, the user may select the bookmark command from the bookmark screen if the user desires to set a bookmark by mapping the currently output web/wap page to the input voice or may select the move command from the bookmark screen if the user desires to switch to a web/wap page mapped to the input voice.

If the bookmark command is input as a result of the determination at step S412, the user terminal sets a bookmark by mapping the current web/wap page address to the recognized voice (S414).

If the bookmark command is not input, but the move command is input (S416) as a result of the determination of step S412, the user terminal inquires previously stored bookmarks and determines whether or not a web/wap page address mapped to the recognized voice exists (S418).

If a mapped web/wap page address exists as a result of the determination of step S418, the user terminal outputs a corresponding web/wap page (S520). At this point, the user terminal transmits a web/wap page request signal including the web/wap page address mapped to the recognized voice to a service providing device, and the service providing device transmits a corresponding web/wap page to the user terminal.

If a web/wap page address mapped to the recognized voice does not exist as a result of the determination of step S418, the user terminal outputs a re-input message (S524). At this point, the re-input message may be output in the form of a pop-up window or the like. The user may confirm the re-input message and switch to a desired web/wap page by performing the steps from step S408.

Through the steps described above, a user may easily access to a web site and manage bookmarks by utilizing a voice to access a specific web site in a mobile environment in which input of a URL or the like is not easy.

In addition, according to still another aspect of the present invention, a method of providing a bookmark based on a motion by the service providing server 200 may be recorded as a program in a recording medium which can be read by an electronic device, and the bookmark providing method includes the steps of: displaying, by a user terminal, a bookmark screen for inputting a motion for setting a bookmark in a predetermined area of a mobile web/wap page and, if a bookmark motion is input through the bookmark screen, displaying the input bookmark motion on the bookmark screen; setting a bookmark by mapping the input bookmark motion to address information of a corresponding mobile web/wap page and storing the bookmark in the bookmark database 210; and switching, when a motion the same as the bookmark motion is input through the user terminal, to a mobile web/wap page of address information previously mapped to the input motion and stored, with reference to the bookmark database 210.

Such a method of providing a bookmark based on a motion by the web page providing server in a mobile web/wap page can be created as a program, and the codes and code segments configuring the program may be easily inferred by the programmers in the art. In addition, the program related to the bookmark providing method based on a motion at a mobile web/wap page of the service providing server 200 may be stored in an information storage medium that can be read by an electronic device and read and executed by the electronic device.

On the other hand, according to still another aspect of the present invention, there is provided a recording medium which can be read by an electronic device, in which a bookmark service providing method based on a voice is recorded as a program, and the bookmark service providing method includes the steps of: (a) outputting, if a voice input command is input while a specific web/wap page is output, a bookmark screen in a predetermined area of the specific web/wap page; (b) driving, if a voice input start command is input through the bookmark screen, a provided voice recognition unit 320 and recognizing an input voice through the voice recognition unit 320; and (c) setting, if a bookmark setting command is input through the bookmark screen, a bookmark by mapping the recognized voice to an address of the specific web/wap page.

Such a bookmark service providing method based on a voice can be created as a program, and the codes and code segments configuring the program may be easily inferred by the programmers in the art. In addition, the program related to the bookmark service providing method based on a voice may be stored in an information storage medium that can be read by an electronic device and read and executed by the electronic device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A bookmark providing system based on a motion or a voice, the system comprising:
   a user terminal configured to:
      display a bookmark screen including user input options in a predetermined area of a mobile web page; and
      when a bookmark motion or a bookmark voice is input:
         automatically capture the bookmark motion or record the bookmark voice;
         patternize the bookmark motion or the bookmark voice; and
         display the bookmark motion or the bookmark voice on the bookmark screen; and
   a service providing server configured to:
      communicate with the user terminal through a network;
      set, when the bookmark motion or the bookmark voice is input through the bookmark screen of the user terminal, a bookmark by mapping the bookmark motion or the bookmark voice with a corresponding mobile web page;
      store the bookmark in a memory; and
      switch, when a user motion or a user voice is the same as the bookmark motion or the bookmark voice, to the corresponding mobile web page based on the bookmark stored in the memory,
   wherein the bookmark is set based on pattern matching of the bookmark motion or the bookmark voice with the user motion or the user voice,
   wherein the service providing server provides a menu for setting the bookmark for the corresponding mobile web page or moving to the corresponding mobile web page, and
   wherein the bookmark motion is displayed in a two-dimensional form on the bookmark screen by capturing the bookmark motion.

2. The bookmark providing system of claim 1, wherein the user terminal comprising a processor configured to execute instructions stored in the memory and:
   communicate with the service providing server through the network;
   display the bookmark screen in the predetermined area of the mobile web page;
   when the bookmark motion or the bookmark voice is input through the bookmark screen, display the bookmark motion or the bookmark voice on the bookmark screen;
   automatically capture the bookmark motion;
   record the bookmark voice;
   patternize the bookmark motion;
   display the bookmark motion on the bookmark screen;
   cause the service providing server to set the bookmark by mapping the bookmark motion with a corresponding mobile web page;
   when the user motion is the same as the bookmark motion, switch to the corresponding mobile web page based on the bookmark stored in the memory;
   output, when the bookmark voice is input through a web/wap page, a voice input screen in a predetermined area of the web/wap page;
   recognize the bookmark voice; and
   set the bookmark by mapping the bookmark voice with a corresponding web/wap page or switch to the corresponding web/wap page based on the bookmark stored in the memory.

3. The bookmark providing system of claim 2, wherein the processor is further configured to:
   output, when the bookmark voice is input through the web/wap page, the bookmark screen in the predetermined area of the web/wap page;
   recognize the bookmark voice when the bookmark voice is input through the bookmark screen;
   set, when the bookmark voice is input through the bookmark screen, the bookmark by mapping the bookmark voice with the corresponding web/wap page;
   determine whether the corresponding web/wap page exists based on the bookmark stored in the memory;
   switch to the corresponding web/wap page when it is determined that the corresponding web/wap page exists; and
   output a re-input message when it is determined that the corresponding web/wap page does not exist.

4. A service providing server comprising a memory and a processor, wherein the processor is configured to execute instructions stored in the memory and to:
   communicate with a user terminal through a network;
   display a bookmark screen including user input options in a predetermined area of a mobile web page;
   cause the user terminal to automatically capture a bookmark motion or record a bookmark voice when the bookmark motion or the bookmark voice is input;
   cause the user terminal to patternize the bookmark motion or the bookmark voice;

display, when the bookmark motion or the bookmark voice is input, the bookmark motion or the bookmark voice on the bookmark screen;

set a bookmark by mapping the bookmark motion or the bookmark voice with a corresponding mobile web page;

store the corresponding mobile web page in the memory;

switch, when a user motion or a user voice is the same as the bookmark motion or the bookmark voice, to the corresponding mobile web page based on the bookmark stored in the memory, wherein the bookmark is set based on pattern matching of the bookmark motion or the bookmark voice with the user motion or the user voice, wherein the service providing server provides a menu for setting the bookmark for the corresponding mobile web page or moving to the corresponding mobile web page, and wherein the bookmark motion is displayed in a two-dimensional form on the bookmark screen by capturing the bookmark motion.

5. A method of providing a bookmark based on a motion by a web page providing server in a mobile web page, the method comprising:

displaying, by a user terminal, a bookmark screen including user input options in a predetermined area that is configured within the mobile web page screen of the user terminal;

automatically capturing a bookmark motion by the user terminal;

recognizing, by the user terminal, whether the bookmark motion is input through the user input options in the bookmark screen;

patternizing the bookmark motion;

displaying the bookmark motion on the bookmark screen when the bookmark motion is recognized by the user terminal;

setting, by a service providing server, a bookmark by mapping the bookmark motion with a corresponding mobile web page;

storing the bookmark in a memory; and switching, by the service providing server, when a user motion is the same as the as the bookmark motion, to the corresponding mobile web page based on the bookmark stored in the memory, wherein setting the bookmark is based on pattern matching of the bookmark motion with the user motion, wherein displaying the bookmark screen comprises providing a menu for setting the bookmark for the corresponding mobile web page or moving to the corresponding mobile web page, and wherein the bookmark motion is displayed in a two-dimensional form on the bookmark screen by capturing the bookmark motion.

* * * * *